Sept. 1, 1942.     S. WARE     2,294,704
SLED
Filed Oct. 21, 1940
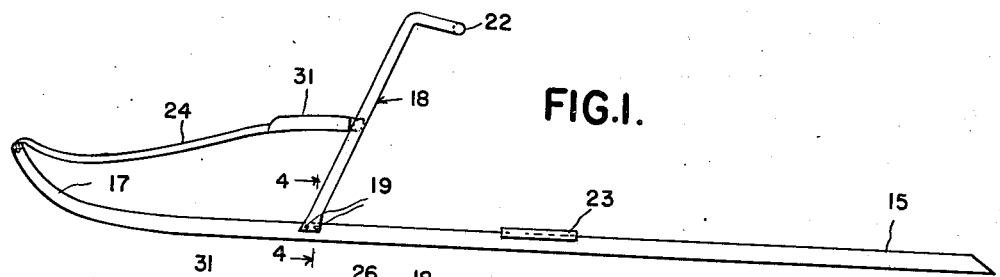
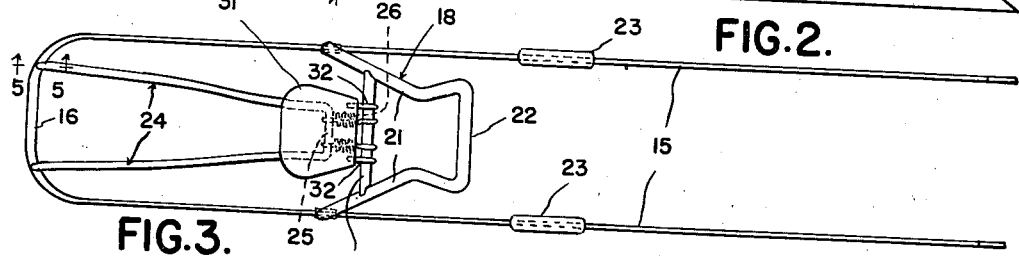
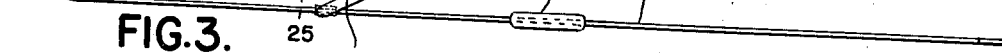
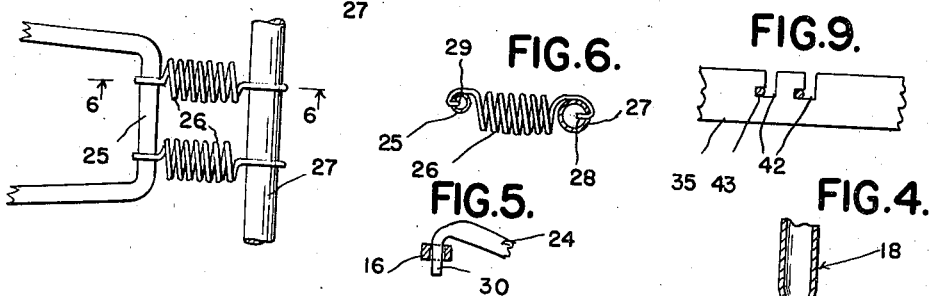
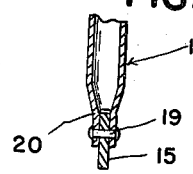
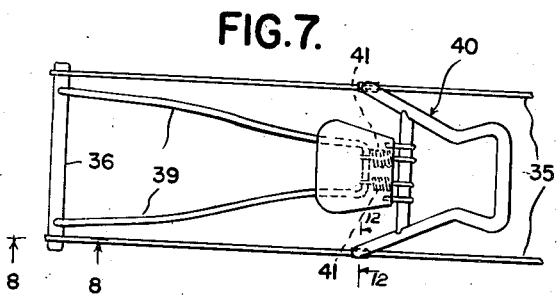
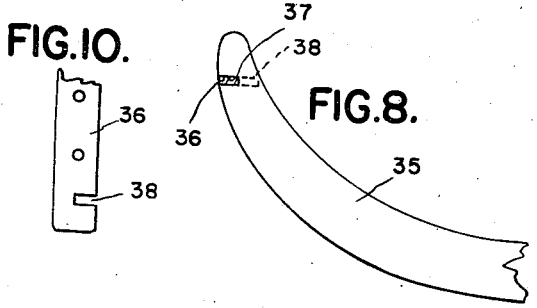
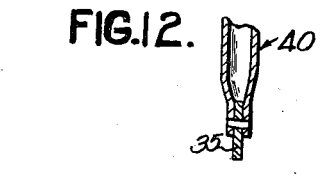
INVENTOR.
SEVERIN WARE
BY Whittemore Hulbert & Belknap
ATTORNEYS Patented Sept. 1, 1942

2,294,704

UNITED STATES PATENT OFFICE 2,294,704

SLED

Severin Ware, Detroit, Mich.

Application October 21, 1940, Serial No. 362,121

6 Claims. (Cl. 280—23)

This invention relates generally to sleds and refers more particularly to sleds of the type capable of being propelled by the operator's foot.

It is one of the principal objects of this invention to improve generally sleds of the above type by reducing the number of parts to a minimum and by simplifying the construction of the several parts involved.

A feature of this invention which contributes materially to reducing the number of parts of the sled consists of forming the side runners from a single strip of spring metal bent or otherwise formed to a generally U-shaped configuration with the sides of the legs of the U forming the runners, and with the base portion of the U forming a cross member between the front ends of the runners.

Another object of this invention resides in the provision of an inverted substantially U-shaped brace having the ends of the leg portions respectively secured to the runners intermediate the ends of the latter and having the base portion forming a hand engaging rest.

Still another feature of this invention consists of providing a sled of the type set forth above with a substantially U-shaped seat supporting brace having the free ends of the legs portions anchored on the cross member at the front ends of the runners and having the rear end connected to the inverted U-shaped brace previously referred to.

A still further object of this invention is to detachably secure the free ends of the inverted U-shaped brace to the runners by bayonet slot connections rendering it possible to quickly assemble and disassemble the brace.

A still further object of this invention is to connect the seat supporting brace to the inverted U-shaped brace by means of springs having the dual function of yieldably resisting disengagement of the bayonet slot connections referred to in the preceding paragraph and, also, forming a yieldable suspension for a seat.

Still another advantageous feature of the present invention is to provide a sled having separate runners connected together at the forward ends by means of a cross member having the opposite ends respectively engaged in forwardly opening slots formed in the front ends of the runners and yieldably held in assembled relation on the latter by the springs connecting the seat supporting brace to the inverted substantially U-shaped brace.

In addition to the foregoing, this invention contemplates a sled wherein the braces previously referred to are formed of tubular stock and, as a consequence, are of strong, durable, light weight construction.

The foregoing, as well as other objects, will be made more apparent as this description proceeds, especially when considered in connection with the accompanying drawing, wherein:

Figure 1 is a side elevation of a sled constructed in accordance with this invention;

Figure 2 is a top plan view of the construction shown in Figure 1;

Figure 3 is a fragmentary plan view of the sled showing the seat removed for the sake of clearness;

Figure 4 is a sectional view taken on the line 4—4 of Figure 1;

Figure 5 is a sectional view taken on the line 5—5 of Figure 2;

Figure 6 is a sectional view taken on the line 6—6 of Figure 3;

Figure 7 is a fragmentary plan view of a slightly modified form of the construction;

Figure 8 is a sectional view taken on the line 8—8 of Figure 7;

Figure 9 is an elevational view partly in section showing the connection between the runners and the leg portions of the inverted U-shaped brace;

Figure 10 is a fragmentary detail view illustrating one end of the cross member shown in Figure 7;

Figure 11 is an end elevational view of the cross member; and

Figure 12 is a sectional view taken on the line 12—12 of Figure 7.

The sled illustrated in Figures 1 to 6, inclusive, comprises laterally spaced runners 15 formed from a single strip of spring steel bent or otherwise fashioned to a generally U-shaped configuration. The leg portions of the U form the runners 15 and the base of the U forms a cross member 16 at the forward ends of the runners. Upon reference to Figure 1, it will be noted that the runners are disposed in parallel vertical planes so as to have an edge engage with the supporting surface, and the forward ends of the runners are bent or otherwise formed to provide upwardly curved portions 17.

The runners 15 are also interconnected at points intermediate the ends thereof by means of a substantially inverted U-shaped brace 18 extending generally in a vertical direction from the runners and having the free ends of the leg portions secured to the runners by means of rivets or other fastening means 19. The brace 18 is shown herein as being formed of tubular stock, and the lower ends of the leg portions are flattened and slotted to form a bifurcated portion 20 for receiving the runners 15.

Upon reference to Figure 2, it will be noted that the legs of the inverted U-shaped brace 18 are provided with converging portions 21 which are bent rearwardly at substantially right angles to the plane of the brace to form a hand engaging rest 22. Suitable foot engaging pads 23 are secured to the runners 15 in rear of the brace 18 in positions to permit the operator to stand on the pads while grasping the rest 22 with his hands.

The inverted U-shaped brace 18 is connected to the cross member 16 at the forward ends of the runners 15 by means of a substantially horizontal U-shaped brace 24. The brace 24 is in the form of tubular stock bent to the desired U-shaped configuration and having the base portion 25 thereof connected to the brace 18 by means of a pair of coil springs 26. In this connection it will be noted that the inverted U-shaped brace 18 is provided with a tubular cross bar 27 having the opposite ends welded or otherwise suitably secured to the leg portions of the brace 18 intermediate the ends of the latter. Upon reference to Figure 6, it will be noted that the rear ends of the springs 26 are looped around the cross bar 27 and are provided with projections 28 which extend forwardly into the tubular cross bar 27 through suitable openings in the latter. The forward ends of the springs 26 are looped over the base portion 25 of the brace 24 and are provided with rearwardly projecting ends 29 which extend into the base portion 25 through suitable openings formed in the latter.

It follows from the foregoing that the rear end of the brace 24 is yieldably connected to the substantially vertical brace 18 intermediate the ends of the latter by the coil springs 26. The forward ends of the leg portions of the U-shaped brace 24 are reduced and are bent downwardly to form hooks 30, shown in Figure 5 as adapted to extend through openings formed in the cross member 16. These hooks are held against accidental disengagement from the cross member 16 by the springs 26 which continually exert a rearward pull on the brace 24.

If desired, a seat 31 may be supported on the rear end of the brace 24 directly above the springs 26. In the present instance, the seat 31 is connected to the cross bar 27 by means of a pair of hooks 32 secured to the seat 31 and adapted to be hooked over the brace 27. It follows from the above that the springs 26 not only serve to yieldably connect the brace 24 to the brace 18 but, also, function as a yieldable support for the seat 31.

It will be noted particularly from Figure 2 that the runners 15 extend for a substantial distance rearwardly of the brace 18 and are free from connection with each other in rear of the latter brace. As a result, the runners are highly flexible, and the sled may be easily turned in etiher direction by applying a pressure on one or the other of the runners, depending upon the direction in which it is desired to turn the sled. This pressure may be applied either directly to the runners by proper manipulation of the feet of the operator, or it may be applied indirectly to the runners through the medium of the hand rest 22. In either case, the sled is highly sensitive to the application of pressure to the runners and, consequently, may be turned with relatively little effort.

Referring now to the embodiment of the invention illustrated in Figures 7 to 11, inclusive, it will be noted that the sled comprises a pair of runners 35 formed separately from spring steel and also arranged to have an edge engagement with the supporting surface. As in the first described form of the invention, the forward ends of the runners are bent to provide upwardly curved portions, and the upper extremities of the latter are connected together by means of a cross member 36. Upon reference to Figure 8, it will be noted that the upper end of each runner is formed with a slot 37 which extends rearwardly from the front edge of the runner, and the adjacent end of the member 36 is formed with a rearwardly opening slot 38. The arrangement is such as to permit the opposite ends of the cross member to be extended into the slots 37 in the runners and to permit the adjacent portions of the runners to extend into the slots 38 in the cross member. As a result, a readily detachable interlocking connection is provided between the cross member and the runners.

Upon reference to Figure 7, it will be noted that a substantially horizontal U-shaped brace 39 identical to the U-shaped brace 24 is connected to the cross member 16. Also, the rear end of the brace 39 is connected to a substantially vertically extending brace 40 by means of a pair of coil springs 41 in the same manner previously described in connection with the first embodiment of this invention. Although the substantially vertical brace 40 is exactly the same in construction as the brace 18 previously described, nevertheless, the lower ends of the leg portions of the brace 40 are connected to the runners 35 in a different manner. Upon reference to Figure 9, it will be noted that each runner 35 is formed with a pair of bayonet slots 42 adapted to have an interlocking engagement with the fastener elements 43 carried by the lower ends of the leg portions of the brace 40.

The above construction is such that the coil springs 41 serve to yieldably hold the opposite ends of the cross member 36 in interlocking engagement with the respective runners 35 and to, also, yieldably hold the lower ends of the cross brace 40 in interlocking engagement with the runners 35. It will, also, be apparent that the above construction may be quickly assembled and disassembled without the use of wrenches or tools of any kind. This is particularly advantageous in that it renders it possible to transport the sled in a "knock down" condition and permits the sled to be readily assembled when it is desired to use the same.

What I claim as my invention is:
1. A sled having laterally spaced side runners comprising flat relatively thin strips positioned to have an edge engagement with the ground, a cross member connecting the forward ends of the runners, each runner provided with an upwardly opening bayonet slot having a lateral extension projecting forwardly of the runner, a hand supporting brace extending generally vertically from the runners and having opposite side members provided with bifurcated lower end portions respectively receiving the runners between the furcations thereof, a pin extending transversely of the bifurcated end of each member, said pins respectively insertable into the open ends of the slots in the runners and engageable in the lateral extensions of the slots upon shifting the brace forwardly relative to the runners, and a connection between the cross member and hand sup- porting brace including spring means normally urging the lower ends of said hand supporting brace forwardly to hold the pins in the extensions of the bayonet slots.

2. A sled having laterally spaced side runners comprising flat relatively thin strips positioned to have an edge engagement with the ground and curved upwardly at the forward ends, a cross member having opposite end portions extending into forwardly opening slots in the upwardly curved portions of the runners and having rearwardly opening slots in registration with the forwardly opening slots for receiving the adjacent portions of the runners, a hand supporting brace extending generally vertically from the runners and attached to the runners intermediate the ends of the latter, and a connection between the cross member and hand supporting brace including spring means normally urging the cross member in a rearward direction to hold the latter in assembled relation to the runners.

3. A sled having laterally spaced side runners comprising flat relatively thin strips positioned to have an edge engagement with the ground and curved upwardly at the forward ends, each runner provided with a pair of spaced upwardly opening downwardly extending slots intermediate the ends thereof and each slot having a forwardly projecting extension, a cross member having opposite end portions extending into forwardly opening slots in the upwardly curved portions of the runners and having rearwardly opening slots in registration with the forwardly opening slots for receiving the adjacent portions of said runners, a hand supporting brace extending generally vertically from the runners and having opposite side members provided with bifurcated lower end portions respectively receiving the runners between the furcations thereof, a pair of pins extending transversely of the bifurcated end of each member and spaced from each other distances corresponding to the spacing of the slots, said pins respectively insertable into the open ends of the slots in said runners and engageable in the lateral extensions of the slots upon shifting the brace forwardly relative to the runners, a second brace extending from the hand supporting brace to the cross member at the forward ends of said runners and connected to said cross member, and springs connecting said second brace to the hand supporting brace and yieldably holding the cross member and hand supporting brace in assembled relation with the runners.

4. A sled having laterally spaced side runners comprising flat relatively thin strips positioned to have an edge engagement with the ground, a cross member connecting the front ends of the runners, a substantially vertical one-piece tubular brace of inverted U-shaped configuration having the free ends respectively connected to the side runners intermediate the ends of the latter and having the base portion thereof forming a hand grip, cooperating interengaging means on the lower ends of the leg portions of the U-shaped brace and on the side runners forming a readily detachable connection therebetween, and means connecting the tubular brace to the cross member including springs operable to maintain the cooperating interengaging means on the lower ends of said tubular brace and runners in engagement.

5. A sled having laterally spaced side runners comprising flat relatively thin strips positioned to have an edge engagement with the ground, a cross member connecting the forward ends of the runners, each runner provided with a slot extending downwardly from the upper edge of the runner and having a lateral extension projecting forwardly of the runner, a hand supporting brace extending generally vertically from the runners and having opposite side members respectively engageable with the runners intermediate the ends of the latter, means on the lower ends of the side members respectively insertable into the open ends of the slots in the runners and engageable in the lateral extensions of said slots upon shifting the brace forwardly relative to the runners, a substantially U-shaped brace having the free ends of the leg portions secured to the cross member at the front ends of the runners and having a base portion positioned adjacent the first brace intermediate the ends of the latter, and a connection between the base portion of the second brace and the first brace operable to maintain the means on the lower ends of the side members of the first brace in the lateral extensions of the slots in said runners.

6. A sled having laterally spaced side runners comprising flat relatively thin strips supported to have an edge engagement with the ground, a cross member connecting the forward ends of the strips, a substantially inverted U-shaped brace extending in a general vertical direction from the runners and having the free ends of the leg portions respectively engaging the runners intermediate the ends of the latter, cooperating interengaging means on the lower ends of the leg portions of said brace and on the side runners providing a readily detachable connection therebetween, a second substantially U-shaped brace having hook portions at the free ends of the leg portions extending downwardly through openings formed in the cross member and having the base portion thereof positioned adjacent the first brace intermediate the ends of the latter, and a connection between the base portion of the second brace and the first brace operable to maintain the hook portions in engagement with the cross member and to also maintain the cooperating interengaging means on the first brace and runners in engagement.

SEVERIN WARE.